United States Patent Office 3,179,679
Patented Apr. 20, 1965

3,179,679
PROCESS FOR PREPARING HALOGENATED ORGANOSILOXANES
Bruce A. Ashby, Schenectady, N.Y., assignor to General Electric Company, a corporation of New York
No Drawing. Filed May 28, 1962, Ser. No. 197,840
3 Claims. (Cl. 260—448.2)

This application is a continuation-in-part of my co-pending application Serial No. 106,519, filed May 1, 1961, now abandoned.

The present invention relates to a method for converting organosilicon polymers to various halogenated organosilicon products. More particularly, the present invention relates to a method for making diorganodihalosilanes or halogen chain-stopped polydiorganosiloxanes, by the distillation of a mixture of an organosilicon polymer, such as a polydiorganosiloxane, a halogenating agent and ferric chloride, and the recovery of an overhead fraction boiling within the range of the desired product.

Methods for making halogenated organosilicon materials such as highly purified diorganodihalosilanes are continually being sought as these compounds are the principal source material for the production of a variety of polydiorganosiloxane fluids and elastomers. Present methods used to make highly pure diorganodihalosilanes involve such elaborate procedures as lengthy fractional distillation, or chemical separation, and require as source materials chlorosilane mixtures obtained by the method of Rochow, Patent 2,380,995, by reacting organic chlorides and heated silicon.

Procedures now employed by the art to make particular halogen chain-stopped polydiorganosiloxanes such as 1,3-dichlorotetramethyldisiloxane, are also subject to deficiencies as they lack the degree of control necessary to provide for optimum yields of desired product. Patnode Patent 2,381,366, for example, shows that a mixture of various halogen chain-stopped polydimethylsiloxanes can be made by the controlled hydrolysis of dimethyldichlorosilane. The separation of a particular halogen chain-stopped polydimethylsiloxane can only be effected by resort to fractional distillation of a mixture of a variety of products. Another method for making 1,3-dichlorotetramethyldisiloxane is shown by Sauer, Patent 2,421,653, which involves heating a mixture of dimethyldichlorosilane, ferric chloride, and a polydimethylsiloxane under elevated pressures. Although the methods of Patnode and Sauer can be employed to make various mixtures of halogen chain-stopped polydiorganosiloxanes, it is difficult to control the reaction conditions employed by these methods to favor the formation of a particular halogen chain-stopped product.

The present invention is based on the discovery that the production of a diorganodihalosilane containing less than 1,000 parts of impurity per million of silane, or the recovery of a halogen chain-stopped polydiorganosiloxane in high yields, can be achieved by distilling a mixture of particular ingredients comprising an organosilicon polymer consisting essentially of diorganosiloxane units, a halogenating agent and ferric chloride. The production of the desired reaction product can be favored by utilizing in the reaction mixture, ingredients having boiling ranges above the desired product. The separation of the desired reaction product can be facilitate by distilling an overhead fraction from the mixture, or forming the mixture at a temperature at which an overhead fraction can be separated which boils at the temperature range of the desired product.

In accordance with the present invention there is provided a process for making a halogenated organosilicon material selected from a diorganodichlorosilane having the formula (1) 

and a halogen chain-stopped polydiorganosiloxane having the formula (2)  $X[SiR_2O]_nSiR_2X$ which process comprises (1) forming a mixture comprising (A) an organosilicon polymer consisting essentially of chemically combined $R_2SiO$ units and having a boiling point above said halogenated organosilicon material, (B) 0.2 to 100 parts and preferably 0.2 to 5 parts per part of (A) of a halogenating agent having the formula (3)  $Z(X)_a$ and (C) from 0.001 to 0.1 part, per part of (A) of ferric chloride, (2) distilling said mixture of (1) at a temperature sufficient to provide for the production of an overhead fraction boiling in the range of said halogenated organosilicon material, and (3) separating said overhead fraction of (2) from said mixture of (1), where Z is a member selected from a phosphorous atom, a

radical, an antimony atom, and a

radical, $a$ is an integer equal to from 1 to 5, inclusive, and equal to the number of unsatisfied valence bonds of Z, $b$ is an integer equal to from 1 to 2, R is an alkyl radical having from 1 to 3 carbon atoms, R' is a member selected from aryl radicals, arylene radicals, and alkylene radicals of from 2 to 10 carbon atoms, and where R' is monovalent, $b$ is equal to 1, and where R' is divalent, $b$ is equal to 2, X is a halogen radical, such as chloro or bromo, and $n$ is an integer equal to from 1 to 10, and preferably 1 to 3, inclusive.

Radicals included by R of Formulae 1 and 2 are, for example, methyl, ethyl and propyl; R can be all the same radical or any two or more of the aforementioned radicals, while R is preferably methyl.

Halogenating agents that can be employed in the practice of the present invention are any halogenating agents that have a boiling range at least 20° C. above the desired halogenated organosilicon materials. For example, thionyl chloride would not be satisfactory as it would contaminate the diorganodihalosilanes of Formula 1. Among the preferred halogenating agents that can be employed to make the halogenated organosilicon materials of Formulae 1 and 2 are aryl acyl halides which have the formula (4) 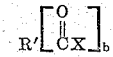

where R', X and $b$ are as defined above.

Illustrative of the groups of radicals within the scope of R' are naphthyl, phenyl, phenylene, naphthalene, ethylene, octylene, etc. Specific examples of acyl halides within the scope of Formula 4 are phthalyl chloride, phthalyl bromide, succinyl chloride, benzoyl chloride, etc. In addition to the aforementioned acyl halides of carboxylic acid, halogenating agents that are also operable are phosphorous trichloride, phosphorous pentachloride, antimony trichloride, antimony pentachloride, phosphorous oxychloride, etc.

Included by the organosilicon polymers of the present invention that can be employed to make the halogenated organosilicon materials of Formulae 1 and 2 are polydiorganosiloxanes having a viscosity of from 10 to $10^9$ centipoises at 25° C. Among the polydiorganosiloxanes for example, are cyclopolydiorganosiloxanes described by Rochow, Chemistry of the Silicones, 2nd edition, John Wiley and Sons, New York (1951), which have the formula (5)
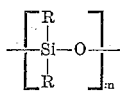

where R is as defined above, and $m$ is an integer equal to from 3 to 20, inclusive, and preferably 3 to 8. For example, there are included cyclopolydialkylsiloxanes such as hexamethylcyclotrisiloxane, octamethylcyclotetrasiloxane, hexaethylcyclotetrasiloxane, octaethylcyclotetrasiloxane, octapropylcyclotetrasiloxane, etc. Also included among the organosilicon polymers of the present invention are linear polydiorganosiloxane polymers convertible to the cured, solid, elastic state, chain stopped with silanol, alkoxy or triorganosiloxy units such as disclosed in Agens Patent 2,448,756, and Sprung et al. Patent 2,448,556, assigned to the same assignee as the present invention. In addition, the organosilicon polymers operable in the present invention, also include the stripped products of reaction of the aforesaid polydiorganosiloxanes, and any standard halogenating agent such as an organochlorosilane, hydrochloric acid, organic acid halide such as aryl acyl halides included by Formulae 3 and 4, etc. The halogen content of these materials can vary between 0.4 to about 35 percent by weight, based on the total weight of diorganosiloxane units and halogen. In the preparation of the halogenated organosilicon materials of the present invention, it is preferred to utilize organosilicon polymers in the reaction mixture that are free of volatiles which boil within a temperature, of about 20° C. above the boiling point of the desired halogenated organosilicon material, particularly if the desired halogenated organosilicon material, is a diorganodihalosilane of Formula 1.

Some of the halogen chain-stopped polydiorganosiloxanes included by Formula 2 are for example, 1,3-dichlorotetramethyldisiloxane, 1,5-dichlorohexamethyltrisiloxane, 1,7-dichlorooctamethyltetrasiloxane, etc. Included by the diorganodihalosilanes of Formula 1 are dimethyldichlorosilane, methylphenyldichlorosilane, diethyldichlorosilane, etc.

In the practice of the invention, a reaction mixture of the organosilicon polymer, a halogenating agent of Formula 3, and ferric chloride is formed, and the mixture is distilled to provide for the separation of an overhead fraction boiling within the range of the desired halogenated organosilicon material.

The order of addition of the various ingredients utilized to form the reaction mixture is not critical. In order to insure optimum results however, certain procedures are preferred depending upon the nature of the desired halogenated organosilicon product and the organosilicon polymer used in the reaction mixture. For example, when making a halogen chain-stopped polydiorganosiloxane, if an organosilicon polymer in the form of a cyclopolydiorganosiloxane is employed to make a halogen chain-stopped polydiorganosiloxane, it has been found expedient to add the polymer at a controlled rate to a heated mixture of the halogenating agent and ferric chloride. The temperature of the mixture of ferric chloride and halogenating agent and the rate of addition of the cyclopolydiorganosiloxane thereto, will vary in accordance with the boiling range of the overhead fraction to be separated. It is preferred to effect the separation of the overhead fraction as quickly as possible to insure optimum yields of the desired halogen chain-stopped polydiorganosiloxane. When making a halogen chain-stopped polydiorganosiloxane of Formula 2, by reacting a halogenating agent of Formula 3 with an organosilicon polymer in the form of the stripped product of reaction of a polydiorganosiloxane and a standard halogenating compound it has been found expedient to add at a controlled rate, the halogenating agent of Formula 3 to a heated mixture of the organosilicon polymer and ferric chloride.

Temperatures at which the mixture can be heated will vary widely, and will depend upon such factors as the pressure at which the process is conducted, boiling range of the desired organosilicon material to be separated, etc. The difference between the overhead temperature and pot temperature will also vary with column size, efficiency of the distillation means employed, etc. At atmospheric pressures, for example, temperatures between 25° C. to as high as 250° C. and higher can be employed to effect the separation of the halogenated organosilicon material from the heated reaction mixture.

In order that those skilled in the art will be better able to practice the present invention, the following examples are given by way of illustration and not by way of limitation. All parts are by weight.

*Example 1*

A mixture of 665 parts of a organosilicon polymer in the form of a chlorine chain-stopped dimethylpolysiloxane containing 21.4 percent hydrolyzable chlorine and 0.3 part of anhydrous ferric chloride was heated to 175° C. The organosilicon polymer had previously been stripped of all volatiles distilling below 139° C. After a trace of reflux appeared from the heated mixture, 500 parts of benzoyl chloride were slowly added. During the addition, reflux was maintained sufficiently to provide for the continuous removal of an overhead fraction boiling at 135 to 140° C. Distillation of the mixture was continued at 135 to 140° C. until no more product was obtained. There was obtained about 642 parts of distillate. The overhead fraction was then redistilled and there was obtained 163 parts of dimethyldichlorosilane, 382 parts of 1,3-dichlorotetramethyldisiloxane, and 100 parts of a residue containing 31.6 percent chlorine. Based on the weight of the original charge, a 50% yield of 1,3-dichlorotetramethyldisiloxane was recovered.

*Example 2*

There are added at a controlled rate, to a mixture of 1,920 parts of benzoyl chloride and 1 part of anhydrous ferric chloride heated to a temperature of 160° C., 1,480 parts of octamethylcyclotetrasiloxane. An overhead fraction is recovered that boils in the range of 211° C. to 230° C. The overhead fraction is redistilled and there is recovered a substantial yield of 1,7-dichlorooctamethyltetrasiloxane.

*Example 3*

A mixture was prepared consisting of 304 parts of phthalyl chloride and 0.5 part of ferric chloride. To this mixture there were added slowly 74 parts of octamethylcyclotetrasiloxane. The temperature of the resulting mixture rose during the addition from an initial 30° C. to 85° C. After completing the addition of the octamethylcyclotetrasiloxane, the mixture was heated and 119 parts of a distillate were collected having a boiling point between 69° C. and 70° C. The product was dimethyldichlorosilane containing less than .1% by weight of contaminating compounds as established by vapor phase chromatography.

*Example 4*

A mixture of 509 parts of isophthalyl chloride and 148 parts of octamethylcyclotetrasiloxane was prepared. No reaction occurred, although the mixture was heated to 140° C. The temperature of the mixture was lowered by external cooling to about 30° C. and about 0.5 part of anhydrous ferric chloride was added. A reaction occured almost immediately, and a total of 163 parts of a distillate were collected. The product was pure dimethyldichlorosilane having less than .1% by weight of contaminating compounds based on values obtained with a vapor phase chromatograph.

*Example 5*

The procedure of Example 4 is repeated except that 180 parts of phosphorous trichloride is used instead of the isophthalyl chloride. There is recovered an equivalent amount of dimethyldichlorosilane at equally high purity.

As a result of the present invention, the art is now provided with an improved process for making halogen chain-stopped polydiorganosiloxanes and highly pure diorganodihalosilanes. These halogenated organosilicon materials are particularly valuable as intermediates for the production of a variety of organopolysiloxane polymers, and reaction products as shown in Patnode Patent 2,503,919 and Hurwitz et al. Patent 2,865,918.

While the foregoing examples have of necessity been limited to only a few of the very many variables within the scope of the present invention, it should be understood the process of the present invention is directed to a much broader class of halogen chain-stopped polydiorganosiloxanes and diorganodihalosilanes as shown in Formulae 1 and 2. The halogenated organosilicon products of Formulae 1 and 2 for example, can be prepared by methods specifically illustrated in the examples and described further in the foregoing description by heating a mixture of an organosilicon polymer within the scope of the present invention, ferric chloride and a halogenating agent of Formula 3, and separating the desired product as an overhead fraction therefrom.

What I claim as new and desire to secure by Letters Patent of the United States is:

1. A process comprising (1) mixing together (A) octamethylcyclotetrasiloxane, (B) 0.001 to .1 part, per part of (A) of ferric chloride, and (C) 1 to 5 parts, per part of (A) of a member selected from the class consisting of phthalyl chloride, isophthalyl chloride, and benzoyl chloride, (2) distilling said mixture of (1), and (3) separating an overhead fraction boiling within the range of a member selected from the class consisting of 1,3-dichlorotetramethyldisiloxane and 1,7-dichlorooctamethyltetrasiloxane.

2. A process comprising (1) mixing together (A) octamethylcyclotetrasiloxane, (B) 0.001 to .1 part, per part of (A) of ferric chloride, and (C) 1 to 5 parts, per part of (A) of a member selected from the class consisting of phthalyl chloride, isophthalyl chloride, and benzoyl chloride, (2) distilling said mixture of (1), and (3) separating an overhead fraction boiling within the range of 1,3-dichlorotetramethyldisiloxane.

3. A process comprising (1) mixing together (A) octamethylcyclotetrasiloxane, (B) 0.001 to .1 part, per part of (A) of ferric chloride, and (C) 1 to 5 parts, per part of (A) of a member selected from the class consisting of phthalyl chloride, isophthalyl chloride, and benzoyl chloride, (2) distilling said mixture of (1), and (3) separating an overhead fraction boiling within the range of 1,7-dichlorooctamethyltetrasiloxane.

References Cited by the Examiner

UNITED STATES PATENTS

| 2,381,366 | 8/45 | Patnode | 260—448.2 |
| 2,421,653 | 6/47 | Sauer | 260—448.2 |
| 2,500,761 | 3/50 | Lewis | 260—448.2 |
| 2,673,843 | 3/54 | Humphrey et al. | 260—448.2 |
| 2,713,063 | 7/55 | Sommer | 260—448.2 |
| 2,787,627 | 4/57 | Kuriyagawa et al. | 260—448.2 |
| 2,934,550 | 4/60 | Jack et al. | 260—448.2 |

OTHER REFERENCES

Gilliam et al.: Journal of the American Chemical Society, vol. 68, 1946, pages 1161–3.

Chernyshev et al.: Chemical Abstracts, vol. 50, 1956, columns 11283–4.

Mellor: "A Comprehensive Treatise on Inorganic and Theoretical Chemistry," vol. 14, page 41, Longmans, Green and Company, New York, 1935.

TOBIAS E. LEVOW, *Primary Examiner.*

SAMUEL H. BLECH, *Examiner.*